H. L. GRISELL.
SCALE-BEAM.
No. 178,629.                            Patented June 13, 1876.
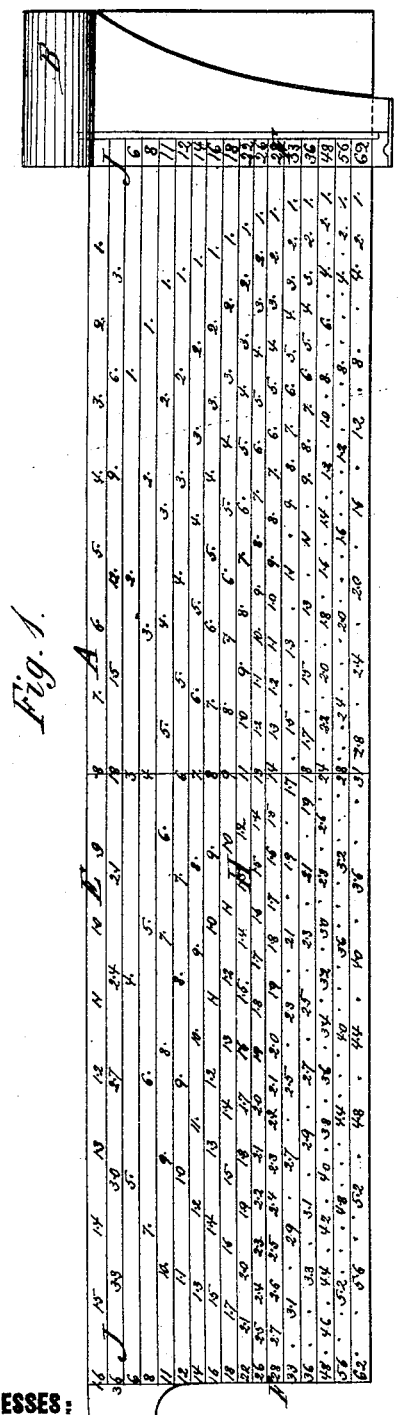
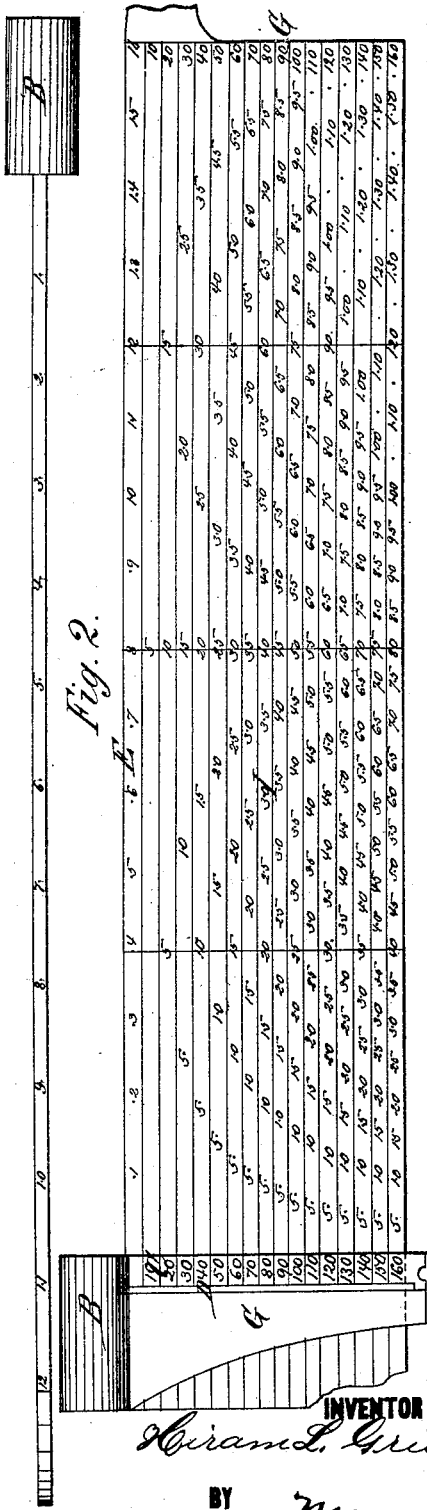
WITNESSES:                              INVENTOR:

UNITED STATES PATENT OFFICE.

HIRAM L. GRISELL, OF PENNVILLE, INDIANA.

IMPROVEMENT IN SCALE-BEAMS.

Specification forming part of Letters Patent No. 178,629, dated June 13, 1876; application filed April 18, 1876.

*To all whom it may concern:*

Be it known that I, HIRAM L. GRISELL, of Pennville, in county of Jay and State of Indiana, have invented a new and Improved Scale-Beam, of which the following is a specification:

My invention is a contrivance of tables with the beams and weight of a scale, for the computation of the values of fractional quantities.

The invention will first be described, and then pointed out in the claim.

Figure 1 represents one side elevation, and Fig. 2 represents the other side elevation, of my improved scale, and Fig. 3 is a top view.

Similar letters of reference indicate corresponding parts.

A is the bearing; B, a principal part of the weight; C, a sixteenth part; and D another fractional part, which, together with C, makes a twelfth part. The top line of figure E on both sides of the beam represents the ounces of the avoirdupois pound, which the weight is adjusted to weigh. F represents price-columns on one side, being the same at the weight and at the outer end of the beam. G represents differently-graduated price-columns on the other side, and the lines H represent the values of the fractional quantities according to the scale of prices of one side, and I the same on the other side.

Example: If fifteen cents' worth of an article worth twenty cents a pound is required, move the weight along the beam until it arrives at fifteen on the line marked twenty at the end, when it will show twelve ounces as the required quantity.

Other things may be computed in the same way. I also have the top edge of the scale-beam divided into twelve parts, corresponding to the ounces of a Troy pound, and I have made the separable parts C D for weighing drams avoirdupois and scruples apothecaries' weight, the part C representing one dram avoirdupois for each ounce-mark on the beam, and the two parts C and D representing two drams apothecaries' weight for each ounce marked on the top of the scale. The line J represents a yard-scale for calculating yard-measures by the same devices.

Having thus described my invention, what I claim as new, and desire to secure by Letters Patent, is—

A scale-beam, having weights B C D and columns of figures E F G H I arranged, as shown and described, to adapt it to be used in the manner specified.

HIRAM LAURENCE GRISELL.

Witnesses:
H. Z. JENKINS,
MARSHALL F. BAILY.